J. F. DOUGHERTY.
MACHINIST'S RULE.
APPLICATION FILED SEPT. 27, 1912.

1,198,201.

Patented Sept. 12, 1916.

Witnesses
W. A. Williams
John Rye

Inventor
James F. Dougherty.
By Jac. A. Richmond
Attorney

UNITED STATES PATENT OFFICE.

JAMES F. DOUGHERTY, OF WASHINGTON, DISTRICT OF COLUMBIA.

MACHINIST'S RULE.

1,198,201. Specification of Letters Patent. Patented Sept. 12, 1916.

Application filed September 27, 1912. Serial No. 722,617.

*To all whom it may concern:*

Be it known that I, JAMES F. DOUGHERTY, a citizen of the United States, and a resident of Washington, in the District of Columbia, have invented a new and useful Machinist's Rule, of which the following is a specification.

In machine shop practice and especially in operating on hoops, guns, and other cylindrical stock, considerable time is lost in adjusting, for example, the cutter employed in finishing the rough-dressed bore so that it will not cut beyond a pre-determined dimension. In fact no rule has heretofore been devised that would insure absolute accuracy in this respect. This is due in a measure to the inaccessibility of the parts owing to the type of feed, the boxing or tool support, and to various other conditions more or less obvious.

My invention contemplates means for insuring a precise, accurate, and rapid adjustment of the cutter or other tool, and to this and other ends, it resides in the novel rule or instrument of precision hereinafter described and finally set forth in the claim.

Figure 1:
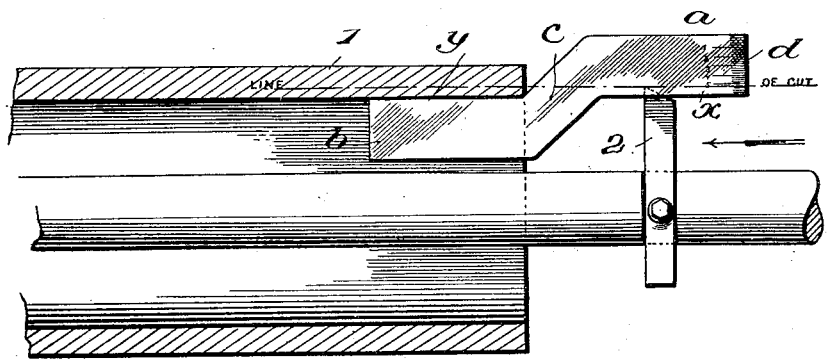
Figure 2:
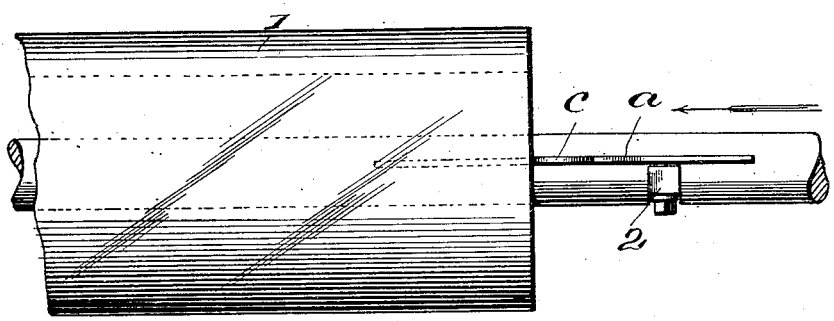
Figure 3:
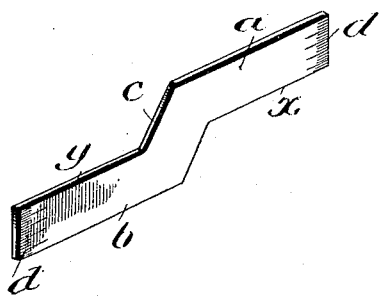

The nature, characteristic features, and scope of the invention will more readily be understood from the following detailed description taken in connection with the annexed drawing forming a part hereof, wherein, Figures 1 and 2, are, respectively, side and top views of a rule made in accordance with my invention, a cutter and a cylindrical work body being shown so as to make clear the *modus operandi* of the rule; and Fig. 3, is a perspective view of a reversible rule.

The rule comprises two longitudinally ranging legs or members *a b*, arranged in parallelism, one in advance of the other, and rigidly united. The single blank composing them may be struck or stamped from sheet steel or other suitable material. The legs, or members *a b*, are straight-edged, and the bottom edge *x*, of the forward leg, is in alinement with the top edge *y*, of the rear member. The intermediate part *c*, may have its edges formed on any suitable angle. The leg *a*, is provided with suitable graduations *d*, directed vertically; and manifestly, with a reversible rule as in Fig. 3, both legs would be graduated in this wise.

Referring to Figs. 1 and 2, the numeral 1, designates a cylindrical piece of work, the bore of which is rough dressed and requires to be finished by the tool or cutter 2, which is a milling cutter or any suitable finishing or dressing tool. In applying the rule either leg is inserted so that its edge *y*, lies flush against the work, as in Fig. 1. The tool is then adjusted according to a pre-determined dimension above the coördinate edge of the exposed rule member, and fed to the work in the usual way.

Manifestly with a rule of the character stated absolute accuracy is insured in the adjustment of the cutter and hence the percentage of spoiled work is reduced to a minimum.

It will be obvious to those skilled in the art to which the invention relates that modifications may be made in details without departing from the spirit and scope of the invention. Hence the same is not limited other than required by the prior state of the art.

Having described the nature and objects of the invention I claim as new and desire to secure by Letters Patent, the following:

A device for use in adjusting cutters for finishing or dressing counterbores, consisting of a rule having limbs offset with respect to each other, one of said limbs having a longitudinally disposed straight edge adapted to rest upon the counterbored surface and the other limb having a corresponding straight edge which is alined with the first mentioned straight edge, said rule being reversible and having its ends squared or at right angles to the sides and provided with crosswise ranging graduations whereby the cutter may be accurately adjusted, substantially as specified.

In testimony whereof I have hereunto signed my name in the presence of two subscribing witnesses.

JAS. F. DOUGHERTY.

Witnesses:
HARRY A. HEGARTY,
JAS. A. RICHMOND.

Copies of this patent may be obtained for five cents each, by addressing the "Commissioner of Patents, Washington, D. C."